United States Patent [19]

Hagemeyer, Jr. et al.

[11] 4,310,639

[45] Jan. 12, 1982

[54] POLYALLOMERS AND PROCESS FOR PREPARING SAME

[75] Inventors: Hugh J. Hagemeyer, Jr.; Marvin B. Edwards, both of Longview, Tex.

[73] Assignee: Eastman Kodak Company, Rochester, N.Y.

[21] Appl. No.: 505,227

[22] Filed: Oct. 26, 1965

Related U.S. Application Data

[63] Continuation of Ser. No. 152,001, Nov. 13, 1961, abandoned, which is a continuation-in-part of Ser. No. 668,840, Jul. 1, 1957, abandoned, and Ser. No. 28,826, May 13, 1960, abandoned.

[51] Int. Cl.$^3$ ............................................ C08F 297/08
[52] U.S. Cl. .................................... 525/247; 525/321; 525/323
[58] Field of Search ............... 260/878; 525/247, 321, 525/323

[56] References Cited

U.S. PATENT DOCUMENTS 3,529,037  9/1970  Hagemeyer, Jr. et al. ..... 260/878 B
3,970,719  7/1976  Edmonds ............................ 525/323

*Primary Examiner*—Paul R. Michl
*Attorney, Agent, or Firm*—Clyde L. Tootle; Daniel B. Reece, III

[57] ABSTRACT

A block copolymer consisting essentially of crystalline polymerized propylene segments joined to crystalline segments of polymerized α-mono-olefinic hydrocarbon other than propylene. These block copolymers have an inherent viscosity in Tetralin at 145° C. of from about 0.4 to 2.4, a density of at least 0.85, a brittle point below 0° C. and contain at least 80 percent, by weight, of polymerized propylene.

12 Claims, No Drawings

POLYALLOMERS AND PROCESS FOR PREPARING SAME

This application is a continuation of copending application Ser. No. 152,001 filed Nov. 13, 1961, now abandoned, which is a continuation-in-part of Ser. No. 668,840 filed July 1, 1957, now abandoned, and Ser. No. 28,826 filed May 13, 1960, now abandoned.

This invention relates to novel polymers and methods for preparing the same. More particularly, the present invention relates to novel, solid, crystalline polymers, called polyallomers, prepared from propylene and other α-monoolefinic hydrocarbons and to the process for their preparation.

In recent years, a number of high molecular weight polymers having a crystalline sturcture have been prepared, particularly from olefins, by subjecting the monomer to relatively mild conditions of temperature and pressure in the presence of solid stereospecific polymerization catalysts. Such polymers have been used extensively in a number of different applications including, for example, use in fibers, molding and coating applications, depending upon the specific properties of the polymer. The prior art crystalline polymers are, however, deficient as wholly desirable polymers for many uses since they do not exhibit the combination of good stiffness, tensile strength, elongation, impact strength, hardness and brittle point necessary for such uses. For example, a crystalline polymer having flow properties in the usable range, for example, a melt index in the range of about 2–5, in order to be suitable for most uses should combine a Vicat softening point of at least 138° C., a stiffness of at least 100,000 psi., a tensile strength of at least 3,500 psi., an elongation of at least 600 percent, an Izod impact strength (notched) of at least 1.5 foot pounds per inch notch, a tensile impact strength of at least 64 foot pounds per square inch, a Rockwell hardness on the R scale of at least 75 and a brittle point of less than 0° C. As already indicated, however, prior art crystalline polymers fail to exhibit the aforementioned combination of properties. Thus crystalline polyethylene, in the aforementioned melt index range exhibits a Vicat softening point of only about 128° C., a stiffness of about 80,000 psi., a maximum Izod impact strength (notched) of about 1 foot pound per inch notch, a maximum tensile impact strength of about 30 foot pounds per square inch, an elongation of only about 300 percent and a Rockwell hardness on the R scale of only about 70. Similarly, crystalline polypropylene, having a melt index of 2–5, although it exhibits a number of good physical properties, has an Izod impact strength (notched) of less than 0.5 foot pounds per inch notch, a maximum tensile impact strength of about 30 pounds per square inch, an elongation of only about 50 percent and a brittle point of about 23° C.

It is evident, therefore, that the state of the art will be greatly enhanced by providing a crystalline polymer which combines good stiffness, tensile strength, elongation, impact strength, hardness, Vicat softening point and brittle point. Likewise, a noteworthy contribution to the art will be a method for preparing such polymers.

Accordingly, it is an object of this invention to provide novel crystalline polymers.

Another object of this invention is to provide novel crystalline polymers which exhibit a combination of properties heretofore unattainable with crystalline polymers.

Still another object of this invention is to provide novel crystalline polymers having significantly improved specific properties, for example, brittle points, when compared with prior art crystalline polymers.

Still another object of this invention is to provide novel crystalline polymers which, by virtue of their improved combination of properties, are particularly useful in molding applications where they exhibit superios moldability, low mold shrinkage, lower densities, better mold finish, and optimum film film forming properties when compared with most crystalline prior art polymers.

Still another object of this invention is to provide a novel process for preparing the aforementioned novel crystalline polymers.

Other objects will become apparent from an examination of the description and claims that follow.

In order to accomplish these objects it was necessary to prepare entirely new crystalline polymers, i.e., polymers which are 100 percent insoluble in boiling hexane or show 100 percent crystallinity by X-ray diffraction, which differ markedly from prior art crystalline polymers in chemical composition and combination of physical properties. Since these novel polymers are crystalline, but differ from prior art crystalline polymers in chemical composition and superior combination of physical properties, we have chosen to call them "polyallomers." These polyallomers are solid, crystalline polymers in which the polymer chains comprise two separate and distinct crystalline segments, i.e., a "body" segment and a "tail" segment. The body segment is a polymerized cyrstalline chain of a polymerizable monomer which chain is terminated by a different polymerized monomer group. This terminating polymerized monomer group is also crystalline and comprises the minor portion of the polyallomer, by weight, when compared to the weight of body segment and is designated as the tail segment. There are numerous type of polyallomers depending upon the nature of the crystalline body segment and the crystalline tail segment. Thus, there are di-hydrocarbon polyallomers in which each of the segments are crystalline polyhydrocarbon, for example, crystalline segments of polymerized styrene, olefinic or acetylenic hydrocarbons or mixtures thereof, as exemplified by ethylene, propylene, butene-1, butadiene, tetramethylbutadiene, isoprene, acetylene and the like. Polyallomers in which the body segments are polymerized propylene, for example, are known as "propylene polyallomers" and, if the tail segment of such a polyallomer is polymerized ethylene, then the polyallomer is designated as a propylene-ethylene polyallomer. Still other types of polyallomers are those in which the crystalline body segments are polymerized propylene and the crystalline tail segments are polymerized ethylene and styrene. This type of polyallomer is a ternary polyallomer and would be designated propylene-ethylene-styrene polyallomer. Still other types of polyallomers are hydrocarbon-vinyl polyallomers in which the crystalline body segments are hydrocarbon, for example, polymerized propylene, and the crystalline tail segments are polymerized vinyl compounds, for example vinyl chloride.

The polyallomers are not to be confused with prior art copolymers, amorphous or crystalline, since these prior art copolymers do not exhibit the excellent combination of properties or the chemical structure exhibited by the polyallomers. Thus, an exemplified by U.S. Pat. No. 2,918,457, a crystalline copolymer can be prepared in slurry phase in an inert reaction medium by the simple expedient of subjecting a mixture of propylene and one or more other monomers to polymerization conditions in the presence of a solid, stereospecific polymerization catalyst. However, this type of process results in a copolymer having a random distribution of each of the polymerized monomers in the polymer chain and does not exhibit the stereoregular structure characteristic of polyallomers. As a result, such a random copolymer must contain at least 7 percent butene-1 before the polymer will exhibit a brittleness temperature below 0° C. Furthermore, random copolymers prepared from mixtures of propylene and other α-monoolefinic unsaturated hydrocarbons, for example, ethylene, have brittle points in excess of 7° C., as shown at column 4, lines 8-14 of the aforementioned patent. Moreover, in random copolymers of the type disclosed in U.S. Pat. No. 2,918,457 there is a substantial loss in stiffness which accompanies any lowering of the brittleness temperature. The random copolymers of the prior art exemplified by this patent contain polymer chains which can be represented by the structure AABABBBABA. In contrast the polyallomers can be represented as containing polymer chains represented by the formula AAAAABB wherein A and B are polymerized monomers, AAAAA is the crystalline body segment, and BB is the crystalline tail segment. It is the precise arrangement of the polymerized monomers in the polymer chains of the polyallomers that makes it possible for the polymers to exhibit the excellent combination of physical properties which distinguish them from crystalline polymers prepared heretofore.

Also in prior art polymers prepared from two or more polymerization monomers, it has often been found that the polymer is a blend containing large amounts of mixtures of homopolymers prepared from each of the polymers. These blends are, of course, quite distinct from polyallomers since the latter contain the polymer components in a single polymeric chain. In preparing polyallomers it is advantageous to use no more polymerizable monomer in the process than can be terminally attached to the crystalline body segments of the polymer chains in the polymer, the exact amounts being determinable by the polyallomer being produced and the polymerization conditions employed. By operating in this manner, it is possible to avoid the production of a poly blend or a prior art type of copolymer. Thus, the polyallomers are prepared by polymerizing a crystalline tail segment of a polymerizable monomer onto a preformed crystalline body segment of the polymer chain formed from a different polymerizable monomer using a solid stereospecific polymerization catalyst.

The propylene polyallomers in which the polymer chains are crystalline polymerized propylene body segments terminated by crystalline tail segments of polymerized α-monoolefinic hydrocarbons are of particular interest because these polymers exhibit excellent Vicat softening points, stiffness, impact strength, elongation, and hardness together with very low brittle points, even with extremely low percentages of α-monoolefinic hydrocarbons, for example, less than 1 percent, by weight, in the polyallomers.

The polyallomers can contain varying amounts of each of the monomers in polymeric form in a single chain, as is obvious to one skilled in the art. A wide variation of specific properties of a polyallomer can be achieved by appropriate selection of the monomers employed, the amounts of each monomer employed in preparing the polyallomer, polymerization conditions, and ratio of catalyst components used in forming the polyallomer. For example propylene polyallomers in which the crystalline tail segments are polymerized ethylene and contain only 0.2 percent, by weight, of polymerized ethylene, exhibit a brittle point of $-12°$ C., while a propylene polyallomer of comparable melt index, in which the crystalline tail segment is polymerized ethylene and contains 5 percent, by weight, of polymerized ethylene exhibits a brittleness temperature of $-50°$ C.

As already indicated, propylene polyallomers in which the crystalline tail segment is polymerized α-monoolefinic hydrocarbon other than propylene, are of particular interest by virtue of their very low brittle points even with relatively small percentages, by weight, of different α-monoolefinic hydrocarbons in the polyallomer. In order to obtain a propylene polyallomer exhibiting the optimum combination of physical properties it is desirable that the polyallomer contain at least 80 percent, by weight, of polymerized propylene and at least about 0.1 percent, by weight, of a different α-monoolefinic hydrocarbon, in polymerized form. Thus, the most desirable propylene polyallomers are those in which the crystalline body segments are polymerized propylene and the crystalline tail segments are different α-monoolefinic hydrocarbons in polymerized form, which polyallomers contain about 80 to about 99.9 percent, by weight, of polymerized propylene and about 0.1 to about 20 percent, by weight, of the different α-monoolefinic hydrocarbons in polymerized form. In general, such propylene polyallomers will exhibit molecular weights (Staudinger) of at least 10,000 and preferably molecular weights in the range of about 15,000 to about 100,000. The molecular weights of these polyallomers can be readily determined from their inherent viscosity in tetralin at 145° C. using the Staudinger equation. Thus the inherent viscosity of these polyallomers in tetralin at 145° C. are at least 0.40 and preferably in the range of about 0.55 to about 2.4. In addition these polyallomers exhibit densities (ASTM D1505-57T) of at least 0.85, with densities in the range of about 0.87 to about 0.92 being preferred, and brittle points of less than 0° C. Such polyallomers are readily distinguishable from prior art crystalline polymers by infrared analysis. Thus, these propylene polyallomers exhibit an infrared absorbence at 9.6 microns and another in the range of about 13 to about 14 microns. No other crystalline polymer heretofore available will exhibit this combination of absorbence bands.

As already indicated, polyallomers are prepared in a multistage polymerization procedure comprising initially polymerizing a polymerizable monomer, for example, propylene and then polymerizing at least one different polymerizable monomer, for example, an α-monoolefinic hydrocarbon such as ethylene, in the presence of the polymer chain of the first monomer using a solid stereospecific polymerization catalyst. Thus, propylene or other α-monoolefinic hydrocarbon for example, is contacted with a solid stereospecific polymerization catalyst to form a crystalline polymer chain and the second monomer is then polymerized onto the preformed polymer chain in the presence of the solid stereospecific catalyst. To prepare the propylene polyallomers in which the polymer chains are crystalline body segments of propylene terminated by crystalline tail segments of other α-monoolefinic hydrocarbons the polymerization reaction is continued until the resulting polymer contains at least 80 percent, by weight, of polymerized propylene. This multistage process can be conducted in a single reactor having separate reaction zones preferably separated by a baffle or other separation means. However, the separate polymerization reactions forming our process can also be conducted in separate reactors arranged in series and alternatively the entire process could be carried out in an elongated tubular reactor. The polyallomers can also be produced batchwise by carrying out the first stage of the polymerization with a polymerizable monomer, for example, propylene or other α-monoolefinic hydrocarbon and adding a second α-monoolefinic hydrocarbon after a portion of the first monomer, for example, 20–30 percent, has been polymerized. However, in the preparation of the propylene polyallomers it is preferred that the propylene be employed as the monomer in the first stage. The exact amount of monomer feed after the first stage of the reaction is subject to wide variation depending upon such variables as the reaction conditions employed, the percent of monomer converted in the first stage, the desired molecular weight of the resulting polyallomer and similar factors. Consequently the amount of monomer fed in a specific situation will depend upon the correlation of the several variable factors. However, in the case of the preferred propylene polyallomers this amount of monomer will be such that the resulting polyallomer contains at least 0.1 percent, by weight, of an α-monoolefinic hydrocarbon other than propylene, in polymerized form, and preferably at least 80 percent, by weight, of propylene, in polymerized form.

The solid stereospecific polymerization catalysts that are employed in practicing this invention are an important feature of the process. A number of these solid stereospecific catalysts are known in the prior art. These catalysts are initially mixtures of at least two components, the first component being, for example, a halide of a transition element from the fourth to the sixth subgroups of the Periodic Table and the second component being a metal of Group I-A or II or aluminum, or an alloy of metals of Group I-A and/or II and/or aluminum, or a halide or organometallic compound of a metal of Group I-A or II and/or aluminum, or a complex hydride or a complex organometallic compound of boron or aluminum and a metal of Group I-A or II of the Periodic Table found in "Langes Handbook of Chemistry," 8th Edition (1952), published by Handbook Publishers, Inc. at pages 56 and 57, for example.

The transition metals included in Groups IV-B–VI-B of the Periodic Table are exemplified by metals such as titanium, zirconium, vanadium, molybdenum, chromium and the like. The transition metal halide catalyst components can be used at their maximum valence, or if desired, a reduced valency form of the halide can be employed. It is preferred to use the titanium chlorides which can be in the form of titanium tetrachloride, titanium trichloride or titanium dichloride. Examples of other transition metal halides that can be employed in the process of this invention include titanium tetrabromide, titanium tribromide, zirconium tetrachloride, zirconium tetrabromide, vanadium trichloride, molybdenum pentachloride, chromium trichloride and the like.

Suitable second components which can be employed in conjunction with the transition element halides to form an effective solid, stereospecific polymerization catalyst include, for example, metal alkyls, metal alkyl halides and metal hydrides of aluminum or Group I-A and II as well as the metals alone. The preferred component is a lithium compound, as exemplified by lithium metal, lithium alkyl, lithium aluminum hydride, lithium aluminum alkyls, lithium borohydride and lithium aluminum compounds having the formula:

$$LiAlH_xR_y$$

wherein x and y are integers from 0 to 4, the sum of x and y is 4 and R is a hydrocarbon radical. Suitable Group I-A or II metals include sodium, potassium, lithium, zinc and the like. The alloys, halides, hydrides or organometallic compounds of these metals which can be employed include, for example, sodium amyl, potassium butyl, lithium propyl, zinc dibutyl, zinc diamyl, zinc dipropyl, ethyl magnesium bromide, sodium hydride, calcium hydride, lithium aluminum hydride and the like. Also, the catalyst composition can contain an organo aluminum compound such as aluminum triethyl, aluminum tributyl, ethyl aluminum dichloride, cyclohexyl aluminum dichloride, cyclobutyl aluminum dichloride, ethyl aluminum dibromide, ethyl aluminum sesquichloride, ethyl aluminum sesquibromide, dimethyl aluminum bromide, propyl aluminum dichloride, dibutyl aluminum chloride, diethyl aluminum chloride and the like. If desired, a third component can be employed in order to increase the stereospecificity of the catalyst. Suitable third components include the halides or alkali metals, magnesium oxide, aromatic ethers, for example, diphenyl ether, hydrides of sodium, potassium and lithium and alcoholates of sodium, potassium, lithium, calcium, magnesium, barium, strontium, aluminum, titanium and zirconium. In addition, it is often desirable to employ tertiary amines and tertiary phosphoramides as third components with alkyl aluminum halides.

Catalysts employing lithium, lithium alkyls, lithium aluminum hydride, lithium hydride and lithium aluminum tetraalkyls in combination with the reduced valency form of the transition elements from the fourth to the sixth group of the Periodic Table are preferred for high temperature solution or melt polymerization procedures. These catalysts are particularly effective at temperatures above 120° C. and at these elevated temperatures, it is possible to obtain propylene polyallomers containing less than 5 percent and preferably less than 1 percent, by weight, of an α-monoolefinic hydrocarbon different from propylene. As pointed out previously, such propylene polyallomers exhibit brittleness temperatures which are completely unexpected in view of the small amounts of α-monoolefinic hydrocarbon present therein.

Generally, a mole ratio of second component to metal halide of 0.1:1 to 12:1 is satisfactory in the practice of the process. Where a third component is employed, the mole ratios of metal halide to third component of 0.25:1 to about 1:1 are generally satisfactory. The concentration of the catalyst in the reaction medium can be varied over a wide range. For example, catalyst concentrations of 0.1 percent or less, up to 3 percent or more can be used.

The temperature of the multistage polymerization process can be widely varied. However, temperatures ranging from about 0° C. to about 300° C. can generally be employed. When solid, stereospecific catalysts containing second components other than lithium and lithium compounds are employed, temperatures of 100° C. or less are used. In slurry polymerizations at temperatures below 100° C., the inherent viscosities of polymer can be controlled by the use of a chain terminating agent, for example, hydrogen. In melt or solution polymerization at temperatures above 100° C., and preferably above 150° C., such as, for example, a range of about 130° to 190° C., the inherent viscosity is easily controlled by rigid control of the reaction temperature and to a lesser extent by controlling pressure.

A suitable pressure range for the preparation of polyallomers includes pressures from atmospheric to pressures of about 2,000 atmospheres or more. Generally, it is desirable to use pressures in excess of 15 atmospheres in order to obtain satisfactory rates of reaction, such as, for example, pressure in the range of about 50 to about 150 atmospheres. Elevated pressures for example, 2 to 1,500 atmospheres are often required for polymerization reactions run in the absence of a solvent.

The organic vehicles or solvents that can be employed as reaction media in the process of this invention include aliphatic alkanes or cycloalkanes such as propane, pentane, hexane, heptane, cyclohexane and the like, or hydrogenated aromatic compounds such as tetrahydronaphthalene or decahydronaphthalene or a high molecular weight liquid paraffin or mixture of paraffins, which are liquid at the reaction temperature or an aromatic hydrocarbon such as benzene, toluene, xylene and the like. The nature of the vehicle or solvent is subject to considerable variation but the solvent should be in liquid form at the reaction conditions and relatively inert to the reactants and reaction products. Other compounds that can be employed with good results include ethyl benzene, isopropyl benzene, ethyl toluene, n-propyl benzene, the diethyl benzenes, mono and dialkyl naphthalenes, n-pentane, n-octane, isooctane, methyl cyclohexane, mineral spirits and any of the other well known inert hydrocarbons.

In forming the preferred propylene polyallomers, the α-monoolefinic hydrocarbons used to perpare the crystalline tail segments are readily polymerizable α-monoolefinic hydrocarbons, and preferably the α-monoolefinic hydrocarbons containing 2 to 10 carbon atoms, as exemplified by ethylene, butene-1, pentene-1, 3-methylbutene-1, 4-methylpentene-1, 4-methylhexene-1, 5-methylhexene-1, 4,4-dimethylpentene-1, hexene-1, heptene-1, decene-1, styrene, vinyl cyclohexane and the like.

This invention can be further illustrated by the following examples of preferred embodiments thereof although it will be understood that these examples are included merely for purposes of illustration and are not intended to limit the scope of the invention unless otherwise specifically indicated.

EXAMPLE 1

0.60 grams of LiAlH$_4$ (0.0158 mole) and 2.46 grams of TiCl$_3$ (0.0158 mole) slurried in 900 ml. of mineral spirits is charged to a 2-liter stirred autoclave. The polymerization is carried out as follows:

| Time | Pressure | Temp., °C. |
| --- | --- | --- |
| 3:50 | 800 psig. C$_3$H$_6$ | 133 |
| 4:05 | 1775 | 161 |
| 4:18 | 1050 | 164 |
| 4:25 | 900 | 159 |
| 4:50 | 600 pressured to | |
| 4:52 | 850 psig. with C$_2$H$_4$ | 155 |
| 5:30 | 515 | 154 |
| 7:00 | 185 | 151 |

The autoclave is cooled and the polymer washed free of catalyst with hot isobutanol to yield 320 grams of gross polymer containing 85 percent propylene polyallomer. The propylene polyallomer contains 95 percent by weight of polymerized propylene and 5 percent by weight of polymerized ethylene. The gross polymer exhibits a melt index of 3.6, an inherent viscosity at 145° C. in tetralin of 1.36, a Vicat softening point of 131° C. and a brittleness temperature of −50° C.

Upon extraction with boiling hexane 15 percent of the gross polymer is removed and the crystalline propylene polyallomer is obtained. The crystalline polyallomer has an inherent viscosity at 145° C. in tetralin of 1.55, a Vicat softening point of 139° C., a brittleness temperature of −38° C. and a characteristic infrared absorption maxima at 9.6 and 13.9 microns.

EXAMPLE 2

0.75 grams of LiAlH$_4$ (0.02 mole) and 3.06 grams of TiCl$_3$ (0.02 mole) in 900 ml. of mineral spirits is charged to a 2-liter stirred autoclave. The polymerization is carried out as follows:

| Time | Pressure | Temp., °C. |
| --- | --- | --- |
| 2:45 | 800 psig. C$_3$H$_6$ | 132 |
| 2:55 | 1700 | 150 |
| 3:35 | 550 pressured to 800 psig. with Butene-1 | 167 |
| 3:45 | 500 | 170 |
| 4:10 | 410 | 165 |
| 4:30 | 375 | 160 |

The autoclave is discharged through a filter yielding 400 grams of gross polymer containing a propylene-butene-1 polyallomer containing 96 percent, by weight, polymerized propylene and 4 percent, by weight, of polymerized butene-1. The gross polymer has a brittleness temperature of −35° C. Extraction with refluxing hexane for 10 hours removes 10 percent of the gross polymer leaving the crystalline propylene-butene-1 polymer which exhibits a brittleness temperature of −21° C. and an infrared absorption maxima at 9.6 and 13.1 microns.

EXAMPLE 3

Propylene-ethylene polyallomer is prepared by polymerization in a continuoua 2-stage reactor system. In the first stirred tubular reactor the feed is liquid propylene and the catalyst is ethyl aluminum sesquichloride, hexamethyl phosphoramide and titanium trichloride in a 2/1/3 molar ratio. The catalyst, suspended in xylene, is fed to the liquid propylene and the polymerization is carried out at 80° C. and 770 psig. using 100 ppm. H$_2$ to control inherent viscosity. Conversion in the first stage averages 25–30 percent at a catalyst concentration of 0.2 percent.

The polymer slurry from the first stage is fed to the second stage tubular reactor, 4 weight percent ethylene is added, and the polymerization continued at 80° C. and 860 psig.

From the second stage the polymer slurry in liquid propylene is let down to a solids-gas separator. The olefins are flashed off and the polymer dropped to a wash tank. Catalyst removal is effected with hot isobutanol washing.

The propylene-ethylene polyallomer containing 97 percent, by weight, of polymerized propylene and 3 percent, by weight, of polymerized ethylene in a yield per unit of catalyst of 250 is obtained. The inherent viscosity of the propylene-ethylene polyallomer is 2.2, the brittleness temperature is −28° C. and the infrared spectrum shows absorption maxima at 9.6 and 13.9 microns.

EXAMPLE 4

Five additional runs are made in preparing propylene polyallomers in which three different alpha-olefinic hydrocarbons are employed to form the crystalline tail segments of the polymer chain. The procedural aspects, together with the results of these runs are set forth in the following table. The gross polymer was hexane-extracted for 12 hours at 69° C. in each case. The infrared spectrum for Run 4 in the following table shows the absorption maxima at 9.6 and 13.8 microns.

baffle and having a stirring mechanism extending through the two reaction zones is used in the following runs. In the top zone the agitator shaft that extends through the center of the reactor is provided with a single 4-blade paddle type agitator at the top of the zone. This type of agitator arrangement is used to obtain the maximum amount of reaction in the first zone with a minimum amount of reaction in the first zone with a minimum amount of catalyst. In the second or lower zone mixing paddles are placed substantially along the entire length of the agitator shaft to give a plug flow with a minimum of back mixing from the second to the first zone.

Propylene is compressed to 1250–1500 atmospheres and fed into the top zone at rates varying from 8,600 to 14,100 pounds per hour. A catalyst of 3.2 parts by weight of lithium metal dispersion, 0.17 parts by weight lithium aluminum hydride and 14.3 parts by weight of titanium trichloride, slurried in cyclohexane, is fed at rates varying from 0.2 to 0.45 pounds per hour. The temperature in the first zone is controlled by external cooling and by controlling the rate of feed and temperature of the incoming propylene. Conversions in the first zone are controlled at 20–40 percent by controlling the propylene feed rate and the catalyst concentration employed.

TABLE 1

| Catalyst Components | Mole Ratio of Components | Polymerization Conditions | | Alpha-Olefinic Hydrocarbon Fed to Second Stage | Weight Percent of α-Olefinic Hydrocarbon in Polymer | Brittleness Temperature |
|---|---|---|---|---|---|---|
| | | Solvent | Temp., °C. / Pressure psig. | | | |
| Li TiCl$_3$ Diphenyl Ether Et$_3$Al$_2$Cl$_3$ | 5/1/1 | Cyclohexane | 160 / 1000 | Ethylene | 5 | −50° C. |
| TiCl$_3$ MgO Et$_3$Al | 1/1/1 | Mineral Spirits | 80 / 700 | Ethylene | 3 | −26° C. |
| VCl$_3$ NaF Et$_3$Al | 2/1/1 | Liq. C$_3$H$_6$ | 85 / 770 | Butene-1 | 7 | −15° C. |
| TiCl$_3$ Al(OPr)$_3$ | 2/1/0.5 | Cyclohexane | 85 / 400 | Hexene-1 | 2 | −22° C. |
| LiAlH$_4$ | 0.1/1/4.9 | Mineral Spirits | 160 / 1200 | Ethylene | 10 | −53° C. |

EXAMPLE 5

As previously indicated, propylene polyallomers with superior low temperature properties are produced by carrying out the polymerization in a 2-zone stirred reactor at elevated pressures and temperatures. To illustrate this feature of the invention, an elongated reactor 14 feed long and 20 inches internal diameter separated into two distinct reaction zones by a centrally located In the second zone ethylene is fed to give propyleneethylene polyallomers with superior low temperature brittleness values. Feed rates for ethylene varying from 100 to 1000 pounds per hour are typical of those employed in the practice of this process.

The results of four runs using the procedure described hereinabove are set forth in the following table.

TABLE 2

| Run No. | 1 | 2 | 3 | 4 |
|---|---|---|---|---|
| Propylene feed to first zone, lbs./hr. | 10,800 | 12,100 | 8,900 | 7,300 |
| 3.2 Li, 0.17 LiAlH$_4$, 14.3 TiCl$_3$ cat. feed, lbs./hr. | 0.23 | 0.46 | 0.31 | 0.41 |
| Reactor pressure, atms. | 1270 | 1300 | 1250 | 1500 |
| Reactor temperatures, °C. | | | | |
| First zone top | 170 | 168 | 174 | 178 |
| First zone bottom | 190 | 193 | 191 | 193 |
| Second zone top | 190 | 192 | 196 | 199 |
| Second zone bottom | 186 | 190 | 199 | 206 |
| Ethylene feed to second zone, lbs./hr. | 230 | 380 | 360 | 310 |
| Production rate, lbs./hr. | 3360 | 4020 | 2170 | 2420 |
| Inherent viscosity (tetralin, 145° C.) | 2.57 | 2.31 | 2.42 | 2.68 |
| Percent ethylene | 2.1 | 3.9 | 7.0 | 9.0 |

TABLE 2-continued

| Run No. | 1 | 2 | 3 | 4 |
|---|---|---|---|---|
| Brittleness temperature, °C. | −25 | −41 | <−60 | <−60 |

The infrared spectrum for each of these polyallomers shows absorption maxima at 9.6 and 13.9 microns.

EXAMPLE 6

Aluminum triethyl (5.0 ml.) and titanium tetrachloride (2.4 ml.) are added to 500 ml. of heptane contained in a 1-liter 3-neck flask under a nitrogen atmosphere. The flask is fitted with a gas inlet tube which reaches to the bottom of the flask, a mechanical stirrer, and a brine-cooled reflux condenser. A gas outlet leads from the top of the condenser through a mercury bubbler and finally to an ice trap maintained at −10° to −20° C. The mercury bubbler serves to exclude air from the reaction vessel and the ice trap is used to determine the amount of solvent swept through the condenser with effluent monomer gas.

The catalyst mixture is stirred and propylene is introduced through the inlet tube at such a rate that little escapes through the mercury bubbler. After two hours, 29 grams of propylene is absorbed. The introduction of propylene is stopped and ethylene is introduced for two hours. Cooling is employed during this stage to keep the reaction temperature at or below 60° C.

Methanol (200 ml.) is added to decompose the catalyst and the solid ethylene-propylene polyallomer is recovered by filtration. The solid is washed free of catalyst with hot methanolic hydrochloric acid and methanol. The gross polymer contains 9 percent hexane extractables, weighs 80 grams and melts at 139°–154° C. The properties of the gross polymer are: melt index 0.28, high pressure melt index 0.44, density 0.937, tensile strength at fracture 2054 psi., at upper yield 2175 psi., percent elongation 575, stiffness in flexure 38,600 psi., Vicat softening point 118.2° C. and a brittleness point below −70° C. After hexane extraction of the gross polymer the crystalline ethylene-propylene polyallomer containing 68 percent by weight of polymerized ethylene and 32 percent by weight of polymerized propylene exhibits a melt index of 0.024, a density of 0.940, a tensile strength at fracture of 4600 psi., at upper yield 4350 psi., an elongation of 450 percent, a stiffness of 56,000 psi., a Vicat softening point of 127° C., a brittleness point of −60° C. and an infrared spectrum showing absorption maxima at 9.6 and 13.9 microns.

EXAMPLE 7

A mixture of 500 ml. of heptane, 10.0 ml. of ethyl aluminum sesquibromide and 10.0 ml. of titanium tetrachloride is prepared in a 1-liter 3-neck flask. The flask is fitted for propylene polymerization as described in Example 6. The catalyst mixture is prepared in a nitrogen atmosphere as in Example 6.

The reaction mixture is stirred and propylene is introduced beneath the surface of the liquid. The mixture warms spontaneously to 50°–60° C. and the rate of propylene flow is adjusted so that the temperature of the reaction mixture remains between 50° and 60° C. After four hours the weight of propylene absorbed is 28 grams.

Introduction of propylene is stopped and ethylene is introduced for three hours. Occasional cooling is necessary to keep the temperature of the reaction mixture between 50° and 60° C.

The gross polymer is recovered by filtration and washed free of catalyst with methanolic hydrochloric acid and methanol. This polymer weighs 66 grams and melts at 132°–145°. Properties of the polymer are: high pressure melt index, 2.86; specific gravity, 0.901; tensile strength at fracture, 2280 psi.; at upper yield, 2280 psi.; stiffness in flexure, 33,800 psi.; Vicat softening point, 105.4° C.; and a brittleness point of <−70° C.

Extraction of the gross polymer with boiling hexane removes 8 percent of the gross polymer to give the crystalline propylene-ethylene polyallomer. This propylene-ethylene polyallomer has a specific gravity of 0.915, a tensile strength at fracture of 2750 psi., at upper yield 2990 psi., an elongation of 550 percent, a stiffness in flexure of 65,000 psi., a Vicat softening point of 122° C., a brittleness point of −60° C., and an infrared spectrum which shows absorption maxima at 9.6 and 13.9 microns.

EXAMPLE 8

As already indicated, the propylene polyallomers in which the crystalline tail segments comprise less than 1 percent, by weight, of a different alpha-monoolefinic hydrocarbon in polymerized form, exhibit wholly unexpected low temperature brittleness properties. To illustrate, six runs are made using the following procedure.

The aforementioned propylene polyallomers are prepared by high temperature solution polymerization in a continuous two-stage reactor system. In the first stirred tubular reactor the feed is mineral spirits, propylene and catalyst slurry. The catalyst slurry is a suspension of lithium metal, lithium aluminum hydride, titanium trichloride and sodium fluoride in a mole ratio of 2/0.5/1/1 for Runs 1–3. In Runs 4–6 the catalyst consists of a slurry in mineral spirits of lithium aluminum hydride, titanium trichloride and sodium fluoride at a mole ratio of 1/1/1. The first reactor is maintained at 160° C., 1000 psig. and feed rates are adjusted to give a solids content in the reactor of 20 to 30 percent. The effluent from the first reactor is fed to the second stage stirred tubular reactor which is also operated at 1000 psig. to 160° C. Ethylene gas is fed to the second reactor at a rate such that less than 1 percent ethylene is added to terminate the chains in the polymer. Conversion of this ethylene is essentially 100 percent.

From the second stage reactor the polymer solution is let down to a dilution tank where unreacted propylene is flashed off and fresh mineral spirits is added to yield a solution containing 10 percent solids. The diluted solution is filtered to remove catalyst and the clarified solution is freed of solvent by stripping with hot propylene at 200° C. The solvent free polymer is extruded into strands and chopped into pellets. The pellets are extracted with hexane at 69° C. for 12 hours to remove amorphous polymer and then dried with inert gas. Ethylene content of the various propylene polyallomers is determined by measuring the intensity of the absorption at 13.9 microns in the infrared spectrum. These propylene-ethylene polyallomers also exhibit their characteristic absorption at 9.6 microns. The properties of the polymers and the weight percent of ethylene in polymerized form, present in the polymers are set forth in Table 3 which follows.

TABLE 3

| Run No. | 1 | 2 | 3 | 4 | 5 | 6 |
|---|---|---|---|---|---|---|
| Weight % Ethylene | 0.2 | 0.4 | 0.7 | 0.3 | 0.5 | 0.8 |
| Flow rate at 230° C. using a 2160 g. load; melt index (ASTM D1238) | 1.78 | 2.10 | 1.89 | 5.62 | 10.4 | 8.76 |
| Density (ASTM D1505-57T) | 0.9102 | 0.9109 | 0.9105 | 0.9095 | 0.9100 | 0.9097 |
| Brittleness Temperature, °C. | −12 | −14 | −16 | −12 | −13 | −14 |
| Inherent Viscosity in Tetralin, 0.25 conc. at 145° C. | 1.92 | 1.85 | 1.90 | 1.55 | 1.40 | 1.45 |
| Tensile Strength, 2 in./min., at yield, psi. | 4050 | 3980 | 3900 | 4330 | 4230 | 4070 |
| Stiffness in Flexure, psi. | 122,000 | 118,000 | 114,000 | 128,000 | 123,000 | 117,000 |
| Hardness, Rockwell R Scale | 82 | 79 | 74 | 91 | 89 | 86 |
| Tensile Impact Strength, psi. (ASTM D1822-61T) | 64 | 67 | 77 | 64 | 67 | 71 |
| Izod Impact Strength at 23° C. (ASTM D256-54T) | | | | | | |
| Notched | 0.75 | 0.82 | 0.92 | 0.40 | 0.42 | 0.45 |
| Unnotched | No Break | No Break | No Break | No Break | No Break | No Break |

EXAMPLE 9

As already indicated, the polymerization reaction can be initiated with an α-monoolefinic hydrocarbon other than propylene, for example, ethylene and terminated with propylene. To illustrated, a 2-liter flask containing a catalyst mixture of 7.5 ml. of aluminum triethyl and 3.6 ml. of titanium tetrachloride in 750 ml. of heptane is fitted for polymerization as described in Example 6. The catalyst mixture is stirred and ethylene is introduced until 29 grams has been absorbed. The olefin feed is then switched to propylene and introduction of propylene is continued for five hours. The polymer is recovered by filtration and washed free of catalyst with 10 percent hydrochloric acid in methanol solution, hot 1 percent sodium hydroxide in methanol solution and pure methanol. The yield of colorless gross polymer is 135 grams and contains about 11 percent hexane extractables. The gross polymer has a melt index of 1.69, a specific gravity of 0.891, a tensile strength at fracture of 1405 psi., at upper yield 1405 psi., a percent elongation of 150 percent, a stiffness in flexure of 2700, a Vicat softening point of 83°–84° C. and a brittleness point of −50° C.

Extraction of the gross polymer with refluxing normal hexane for 18 hours removes the 11 percent hexane extractables and yields a crystalline propylene-ethylene polyallomer. This propylene-ethylene polyallomer shows absorption bands at 9.6 and 13.6 microns in the infrared and has a melt index of 0.8, a specific gravity of 0.901, a tensile strength at fracture of 2550 psi., at upper yield 355 psi., an elongation of 600 percent, a stiffness in flexure of 89,000 psi., Vicat softening point of 128° C. and a brittleness point of −42° C.

The propylene-α-monoolefinic hydrocarbon polyallomers are preferred for many applications by virtue of their very excellent combination of physical properties, including, for example, very low brittleness points. However, it is also possible to terminate the crystalline polymerized propylene polymer chains with one or more other polymerizable monomers containing one or more −CH$_2$=CH< groups or more particularly, one or more CH$_2$=C< groups as exemplified by vinyl esters, amides, nitriles, ketones, halides, ethers, a β-unsaturated acids or esters thereof, olefins, substituted olefins, diolefins, alkynes and the like. Suitable monomers of this type, therefore, include acrylonitrile, methacrylonitrile, vinylidene chloride, methyl vinyl ketone, vinyl acetate, ethyl acrylate, methyl methacrylate, vinyl pyridines, N-substituted acrylamides, fumaric, maleic and itaconic acids, 2-chloro ethyl ether, acrylic acid, methacrylic, N-vinyl succinimide, N-vinyl phthalimide, N-vinyl pyrrolidone, butadiene, isoprene, vinylidene cyanide, acetylene, methylacetylene and the like. Of this latter group, the propylene polyallomers in which as little as 20 percent, by weight, or even less than 1 percent, by weight, are crystalline tail segments of one or more diolefins or alkynes are of particular interest. Such polymers are unique in that they exhibit an increased tensile strength and stiffness when compared with crystalline polypropylene containing no diolefin or alkyne, as well as a brittleness temperature which is at least as good as such crystalline polypropylene. Included within this group of propylene polyallomers are those containing as little as 0.1 percent, by weight, of crystalline tail segments of 1,3-butadiene, isoprene, 2-ethyl-1,3-butadiene, 2,4-dimethyl butadiene, 1,1,4,4-tetramethylbutadiene, piperylene, acetylene, methyl acetylene and the like. The range of polyallomers affords a variety of polymers with combinations of properties hitherto unattainable to the extent made possible hereby.

By virtue of their improved properties the propylene polyallomers, and particularly propylene-α-monoolefinic hydrocarbon polyallomers, can be used as substitutes for crystalline polypropylene in applications where their low brittle points are of significance. The propylene polyallomers have may advantages in specific used. For example, in fibers and monofilaments the propylene polyallomers, particularly propylene-ethylene polyallomers, are superior to crystalline polypropylene in that they draw down less and afford tougher filaments resulting in fewer breaks when spinning the finer deniers. Such fibers and filaments can be made in varying deniers and cross sections, and find use as staple or continuous filaments yarns and tows, both bulked and unbulked. Such polyallomer fibers, filaments, tow and yarns find use in textile applications, rugs, industrial fabrics, batts, filters (including cigarette filters) and various other applications where the unique combination of properties characteristic of polyallomers make them particularly useful. In films, the propylene polyallomers have superior toughness, tear resistance and impact strength while exhibiting excellent optical properties. These same advantages also apply to magnetic tape base and photographic film base prepared from propylene polyallomers, particularly propylene-α- monoolefinic hydrocarbon polyallomers. In wire covering and cable jacketing propylene polyallomers offer the advantage of better impact strength, elongation, stress crack resistance and low temperature toughness. The same advantages can be attained when the propylene polyallomers are employed in paper coatings as well as in other surface coatings and laminates with both fibrous and non-fibrous materials, such as laminates with other resins on other polyallomers or with foils or the like. In molded and extruded articles, one very significant advantage of the propylene polyallomers, and particularly propylene-ethylene polyallomers are improved impact strength and low temperature toughness.

In all of the aforementioned uses, the ease of processability of propylene polyallomers is an important advantage over many of the high molecular weight solid polymers known in the prior art, for example, which density polyethylene and acrylonitrilevutadiene-styrene polymer resins. In addition, propylene polyallomers in which the crystalline polymerized propylene chains are terminated with crystalline tail segments of ethylene and styrene, i.e. propylene-ethylene-styrene polyallomers, exhibit extremely high stiffness, toughness and hardness, physical properties closely approximating those of acrylonitrile-butadiene-styrene polymer resins and a greater ease of molding than the latter. Moreover, propylene-ethylene vinyl chloride polyallomers are, in fact, internally plasticized polyvinyl chloride. Hence, the vinyl chloride component imparts stiffness, hardness and flame retarding properties while the propylene and ethylene components impart toughness and ease of processability. Furthermore, the chlorine atoms in these polyallomers can by hydrolyzed to produce dye-receptive hydroxy groups attached directly to the polymer chain. Also many of the polyallomers, particularly those containing a crystalline vinyl segment, exhibit unusual dyeing characteristics without further treatment.

The propylene polyallomers disclosed herein can be stabilized with a variety of antioxidants, alone or in admixture. Thus, for example, the N,N-dialkyl dithiocarbamates, alkyl phenyl salycilates, N,N-diphenyl-p-phenylenediamines, 2-hydroxy benzophenones or butylated hydroxy toluenes and the like can be employed with good results. Specific antioxidants which can be employed include 4,4'-butylidene-bis(6-tert. butyl-meta-cresol), dilauryl-3,3'-thiodipropionate, N-butylated-p-amino phenol, N,N'-disecondarybutyl-p-phenylenediamine, 2,6-ditertiarybutyl-p-cresol, 2,6-ditertiarybutyl-4-methyl phenol, disalicylal propylene di-imine, N,N-disalicylidene-1,2-diaminopropane, N,N'-di(1-methyl heptyl)-p-phenylenediamine, N,N'-di-2-octyl-p-phenylenediamine, N,N'-di(1-ethyl-3-methyl pentyl)p-phenylenediamine, N,N'-di-3(5-methyl heptyl)-p-phenylenediamine, N-1, N-3 dioleoyldiethylene triamine, cresylic acid, diacetone alcohol, isopropanol, toluene, mixed xylenes, butylated hydroxyanisole, butylated hydroxytoluene, propyl gallate, citric acid, propylene glycol, vegetable oil, sodium silico aluminate, mixed glycerides, glyceryl monooleate, diisobutyl adipate or mixtures thereof. A particularly effective synergistic mixture is one comprising dilauryl thiodipropionate with 4,4'-butylidene-bis(6-tert. butyl-meta-cresol), or butyl hydroxy toluene. Metal soaps such as calcium stearate can be added, preferably at concentrations of 1 percent or less, to enhance stability and improve mold release properties of the polyallomers. Slip agents such as oleamide or erucrylamide or antiblock agents such as colloidal silica may also be added particularly where the propylene polyallomers are to be used for film. Furthermore, pigments, extender, plasticizers or fillers, as exemplified by titanium oxides, calcium hydroxide or silicates, can be added to the polyallomers. For use in fiber formation, mixtures of polyallomers, particularly propylene polyallomers, with polyesters or polyamides, for example, nylon, can be used in order to obtain improved dye affinity together with optimum fiber properties. In addition, the propylene polyallomers can be thermally degraded at temperatures above their critical temperatures to form useful products. Low molecular weight liquid and waxy polyallomers also can be made and show excellent adaptability for specialized uses. The polyallomers are also used in wrapping materials, fluid containers, fluid conduits or like articles.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A block copolymer the chains of which consist essentially of crystalline polymerized propylene segments chemically joined to crystalline segments of polymerized α-monoolefinic hydrocarbon other than propylene, said block copolymer having an inherent viscosity in tetralin at 145° C. of from about 0.4 to 2.4, a density of at least 0.85, a brittle point below 0° C. and containing at least 80 percent, by weight, of polymerized propylene.

2. The copolymer of claim 1 wherein said α-monoolefinic hydrocarbon is selected from the group of ethylene and α-monoolefinic hydrocarbons of 4 to 10 carbon atoms, and wherein the copolymer contains at least 80 percent by weight of polymerized propylene and at least 0.1 percent by weight of said polymerized α-monoolefinic hydrocarbon.

3. The copolymer of claim 1 wherein said α-monoolefinic hydrocarbon is selected from the group of ethylene and α-monoolefinic hydrocarbons of 4 to 10 carbon atoms, and wherein the copolymer contains no more than 5 percent by weight of said polymerized α-monoolefinic hydrocarbon.

4. The copolymer of claim 1 wherein said α-monoolefinic hydrocarbon is ethylene and wherein the copolymer contains about 0.1 to about 5 percent by weight of polymerized ethylene.

5. The copolymer of claim 1 wherein said α-monoolefinic hydrocarbon is butene-1 and wherein the copolymer contains about 0.1 to about 5 percent by weight of polymerized butene-1.

6. The copolymer of claim 1 wherein said α-monoolefinic hydrocarbon is hexene-1 and wherein the copolymer contains about 0.1 to about 5 percent by weight of polymerized hexene-1.

7. A block copolymer the chains of which consist essentially of crystalline polymerized propylene segments chemically joined to crystalline segments of polymerized ethylene, said block copolymer having an inherent viscosity in tetralin at 145° C. of from about 0.4 to 2.4, a molecular weight of from about 30,000 to about 270,000, a density of about 0.91, to brittle point of about −12° C. and containing about 0.2 percent, by weight, of polymerized ethylene.

8. A block copolymer the chains of which consist essentially of crystalline polymerized propylene segments chemically joined to crystalline segments of polymerized ethylene, said block copolymer having an inherent viscosity in tetralin at 145° C. of from about 0.4 to 2.4, a molecular weight of from about 30,000 to about 270,000, a density of about 0.90, a brittle point of about −12° C. and containing about 0.3 percent, by weight, of polymerized ethylene.

9. A block copolymer the chains of which consist essentially of crystalline polymerized propylene segments chemically joined to crystalline segments of polymerized ethylene, said block copolymer having an inherent viscosity in tetralin at 145° C. of from about 0.4 to 2.4, a molecular weight of from about 30,000 to about 270,000, a density of about 0.91, a brittle point of about −14° C. and containing about 0.4 percent, by weight, of polymerized ethylene.

10. A block copolymer the chains of which consist essentially of crystalline polymerized propylene segments chemically joined to crystalline segments of polymerized ethylene, said block copolymer having an inherent viscosity in tetralin at 145° C. of from about 0.4 to 2.4, a molecular weight of from about 30,000 to about 270,000, a density of about 0.91, a brittle point of about −16° C. and containing about 0.7 percent, by weight, of polymerized ethylene.

11. The process for preparing a polyallomer which comprises initially polymerizing propylene monomer and then polymerizing ethylene in the presence of the polymerized propylene until a polymer containing at least 80 percent, by weight, of polymerized propylene and at least 0.1 percent, by weight, of polymerized ethylene forms, said polymerization being at a temperature in the range of about 80° to about 100° C. and pressure in the range of about 30 atmospheres to about 100 atmospheres in the presence of a solid stereospecific polymerization catalyst containing titanium halide and alkyl aluminum sesquihalide.

12. The process for preparing a polyallomer which comprises initially polymerizing propylene monomer and then polymerizing ethylene in the presence of the polymerized propylene until a polymer containing at least 80 percent, by weight, of polymerized propylene and at least 0.1 percent, by weight, of polymerized ethylene forms, said polymerization being at a temperature in the range of about 80° to about 100° C. and pressure in the range of about 30 atmospheres t about 100 atmospheres in the presence of a solid stereospecific catalyst containing a titanium halide and an ethyl aluminum sesquichloride.

* * * * *